Feb. 16, 1954

F. CLOETE 2,669,466

FLUID TIGHT PASSAGE JOINT SEAL

Filed Feb. 10, 1948

Inventor
Floris Cloete

By Strauch + Hoffman
Attorneys

Feb. 16, 1954  F. CLOETE  2,669,466
FLUID TIGHT PASSAGE JOINT SEAL
Filed Feb. 10, 1948  3 Sheets-Sheet 2

Inventor
Floris Cloete

By Strauch & Hoffman
Attorneys

Feb. 16, 1954   F. CLOETE   2,669,466
FLUID TIGHT PASSAGE JOINT SEAL
Filed Feb. 10, 1948   3 Sheets-Sheet 3

Inventor
Floris Cloete

By Strauch & Hoffman
Attorneys

Patented Feb. 16, 1954

2,669,466

UNITED STATES PATENT OFFICE 2,669,466

FLUID TIGHT PASSAGE JOINT SEAL

Floris Cloete, Wilkinsburg, Pa., assignor to Rockwell Manufacturing Company, Pittsburgh, Pa., a corporation of Pennsylvania Application February 10, 1948, Serial No. 7,492

9 Claims. (Cl. 285—105)

This invention relates to the sealing of a radial passage extending through the walls of concentric contacting cylindrical and like members and particularly to the mounting of a resilient sealing annulus about the passage for sealing the passage from the space between the adjacent peripheral surfaces.

The invention in its preferred embodiment will be described as applied to a sealing device for fluid meters, motors and other hydraulic apparatus wherein its general object and purpose is to provide a simple and effective sealing means around the fluid flow inlet and outlet ports between the wall of a cylinder in which the movable parts of the apparatus are mounted and an outer surrounding and supporting casing wall and which does not require the manipulation of external adjusting means.

In many such hydraulic units on aircraft the casing and cylinder walls are usually formed of different metals having relatively different coefficients of expansion which, under sudden and severe changes in temperature, results in leakage between the cylinder and casing walls. It is therefore another object of the invention to provide sealing members around such inlet and outlet fluid flow ports which are automatically conditioned in the assembly of the cylinder within the casing to maintain a substantially uniform fluid tight seal between the casing and cylinder walls notwithstanding differences in degree of expansion or contraction of the respective walls.

A more particular object of the invention resides in the provision of a resilient sealing ring seated upon an annular surface surrounding the fluid flow port in the casing wall which is substantially concentric to the cylindrical inner surface of the casing, together with means on the cylinder engaging the ring in the axial insertion of the cylinder into the casing to distort and compress the sealing ring between the peripheral surface of the cylinder and the annular seating surface of the ring, whereby during any relative movement between the opposed surfaces of the cylinder and casing a fluid tight seal will be maintained by the ring against the surface of the cylinder.

An important object of the invention is to provide in any concentric rather closely fitting cylinder or like assembly having a radial passage extending through the walls of both cylinders a novel resilient seal between the passage and the space between the cylinder walls. Pursuant to this object I provide above the passage in one of the walls an annular recess of uniform depth for a resilient seal ring.

It is a more specific object of the invention to provide a special annular member for partially filling an annular groove cut into a cylindrical casing wall around a fluid flow port and having a cylindrical face upon which a resilient sealing ring is seated.

Further objects will appear as the description proceeds in connection with the specification and the accompanying drawings.

In the drawing, wherein I have disclosed one simple and practical embodiment of the present invention and in which similar reference characters designate corresponding parts throughout the several views.

Figure 5:
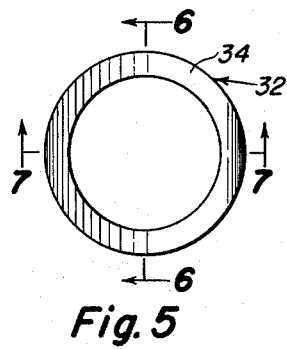
Figure 5 is a top plan view of the annular groove insert of Figure 1.
Figure 6:
Figure 7:
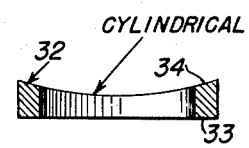
Figure 9:
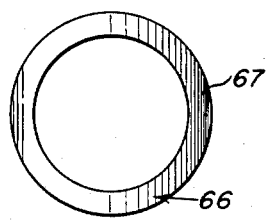
Figure 8:
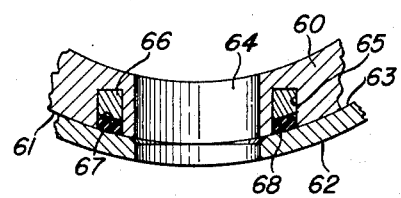

Figures 6 and 7 are substantially vertical sections on lines 6—6 and 7—7 of Figure 5;

Figure 8 is a fragmentary section illustrating a further embodiment of the invention wherein the groove is provided in the inner cylinder;

Figure 9 is a top plan view of the annular groove insert of Figure 8; and

Figure 10:

Figure 10 is a substantially vertical section through the groove insert of Figure 9.

In the assembly of two cylinders, one within the other, as in the illustrated embodiment of the invention wherein a cylinder for a meter rotor is inserted axially within a closely surrounding meter casing, a serious problem has been encountered in maintaining a seal between the space between the cylinders and any radial passage extending through both cylinders. It has been proposed to surround the passage by an annular groove in one of the cylinders and place in the groove a rubber or like resilient ring large enough to be radially compressed in the groove by the other cylinder in the assembly.

The present invention embodies the discovery that as a practical matter it is necessary to provide such a groove of substantially uniform depth in the cylinder in order to obtain efficient sealing. To machine a groove of uniform depth about the passage opening is very difficult since it is practically impossible to machine a suitable curve in a plane at right angles to the axis of the groove, and this is especially difficult where the groove is in the inner cylindrical surface of the meter casing or the outer cylindrical surface of the cylinder. The present invention is broad enough to cover any such manner of providing a groove of uniform depth in the curved cylindrical surface, but as a practical embodiment of the invention I prefer to first machine a flat bottomed groove about the passage opening and then partially fill the groove with a suitably machined hard ring insert that provides a curved face below and parallel to the surface in which the groove is cut and thus provide a recess of uniform depth for the resilient ring. The advantage of this construction is that the ring insert is easily machined to shape apart from the meter casing or rotor cylinder and readily positioned in the groove during assembly, thereby reducing expense and labor in manufacture and reducing waste.

In the illustrated embodiment of the invention of Figures 1–7, the meter casing 10 and manifold 12 may be formed as a single integral casting from aluminum alloy or other comparatively light weight metal. The finished cylindrical cylinder receiving bore 14 of the casing is of uniform diameter and is open at opposite ends.

The manifold 12 at the lower side of the casing is formed with oppositely extending inlet and outlet conduits 16 and 18 respectively in communication with fluid flow ports 20 and 22 respectively extending radially through the casing wall. Fluid under pressure is conveyed to the apparatus through a suitable conduit (not shown) connected with inlet 16 from a pump or other source of supply, and from the apparatus through a similar conduit connected with outlet 18 to a reservoir or point of utilization.

Radially of the meter casing and in axial alignment with the respective ports 20 and 22, the wall of casing 10 is provided with openings 24 and 26 respectively. By means of a suitable tool inserted through these openings, a trepanning operation may be trans-axially performed to cut continuous grooves 28 and 29 in the inner cylindrical face of the casing wall in accurate concentric relation with the respective ports 20 and 22. These grooves 28 and 29 are of predetermined depth and the flat bottom walls 30 of each are disposed in planes substantially normal to the axes of the associated ports.

Before mounting the usual rotor and cylinder assembly in the casing 10, a rigid metal or like hard insert ring 32 is placed in each of the grooves 28 and 29 with the lower flat surface of each ring in contact with the bottom wall 30 of its groove.

Referring to Figures 2 and 5–7 each ring 32 is a circular ring having a flat bottom surface 33 and an upper surface 34 that is cylindrical in curvature and of the same curvature as surface 14 in which grooves 28 and 29 are cut. Ring 32 is of such radial thickness as to fit snugly and friction tight in each groove and when bottomed it locates surface 34 at the desired depth to provide a continuous recess of uniform depth about the associated port.

Preferably ring 32 is fabricated by taking a short flat-ended tube of circular cross section and machining one end to the cylindrical curvature desired. The relative depths of the grooves and axial length of ring 32 may be varied to obtain suitable predetermined uniform depth recesses as desired.

Figure 2:
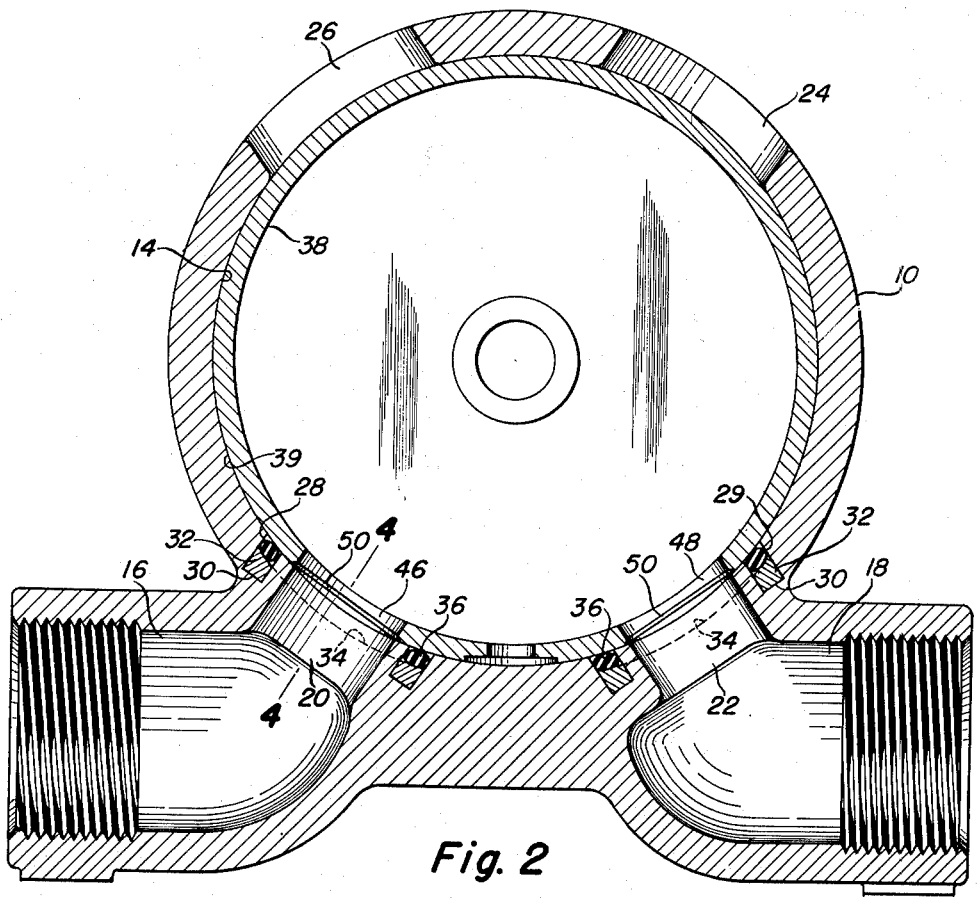
Figure 2 is a vertical sectional view taken substantially on the line 2—2 of Figure 1, the rotor and division plate within the cylinder being omitted.
Figure 4:
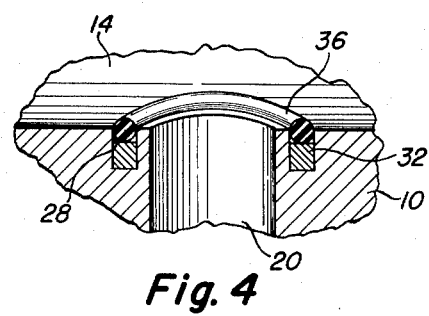
Figure 4 is a section substantially on line 4—4 of Figure 2 with the cylinder omitted to show the seating of the resilient ring in its groove.

After each insert 32 is in place with its surface 34 parallel to the surface of bore 14, a resilient ring 36 of synthetic rubber or like resilient material, preferably oil resistant and circular in cross section, is placed in each uniform depth recess. As illustrated in Figures 2 and 4, the recess depth above surface 34 is preferably somewhat less than the diameter of ring 36 so that the latter will project above the surface of bore 14. Also, as illustrated, the radial dimension of each groove 28 and 29 is preferably about the same as the diameter of ring 36 to prevent undesired displacement or distortion of the resilient ring during assembly of the cylinder with the casing.

Figure 1:
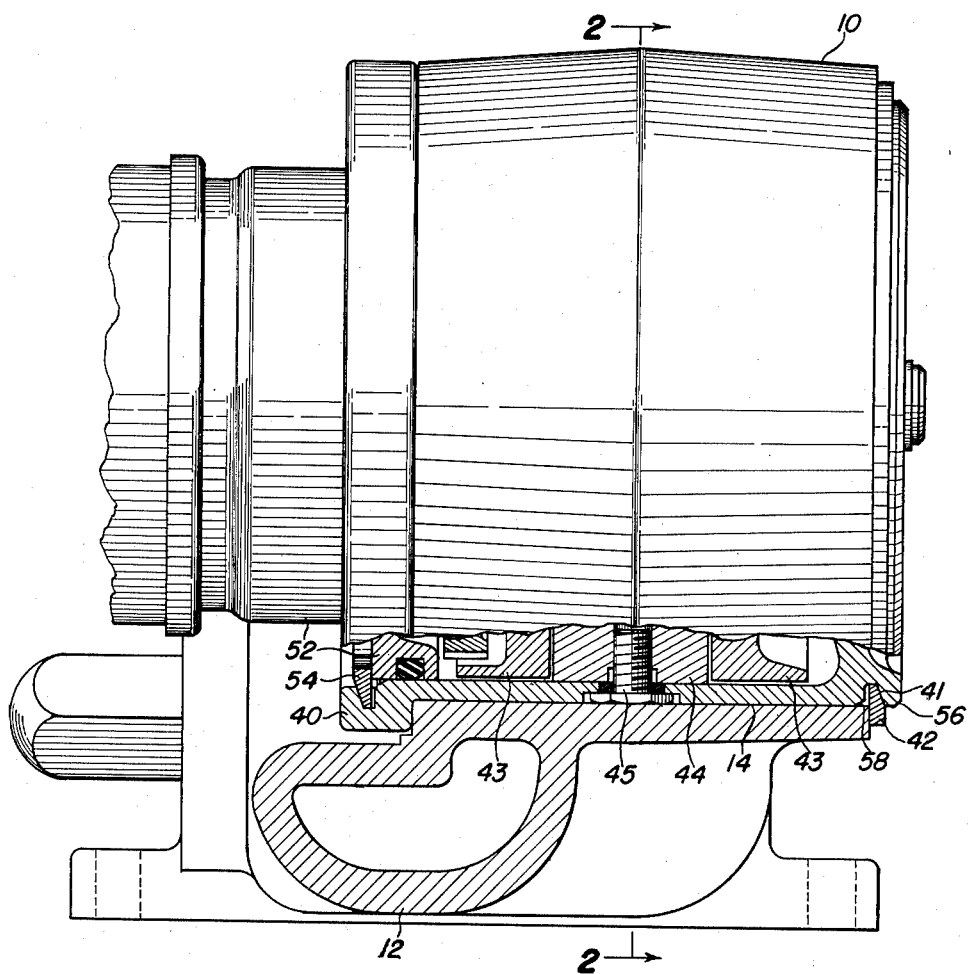
Figure 1 is a side elevation, partly in section, of a fluid meter or motor to which my invention has been applied, for purposes of illustration.

Cylinder 38 is preferably of steel or other suitable metal alloy having the required physical characteristics and strength and with its internal rotor assembly in place is adapted to be axially inserted within outer casing 10 from one end thereof. Cylinder 38 on one of its ends is formed with an external flange 40 to abut the end of the casing wall and limit such axial insertion of the cylinder through the casing. The other end of the cylinder is closed and is formed with an external peripheral groove 41 to receive an expansible locking ring 42 which abuts the other end edge of casing 10, thereby locking the cylinder in fixed axial relation to the casing wall. As shown in Figure 1, between spaced side members 43 of the rotor, a division plate 44 is rigidly fixed to the internal surface of the cylinder wall as by screw 45.

The peripheral wall of the cylinder 38 is provided with circumferentially spaced ports or openings 46 and 48 respectively of approximately the same diameter as the ports 20 and 22 in the wall of casing 10 with which they are respectively adapted to register and form through passages to the conduits. Preferably, at the outer edge of each of these ports, the cylinder wall is chamfered or formed with a shallow countersink 50 for a purpose which will be presently explained. The open end of the cylinder is closed by a removable cover plate 52 secured by the split locking ring 54 engaged with an internal annular groove in the flange 40 of the cylinder.

The closed end of cylinder 38 at each side of the groove 41 is provided with similarly inclined or chamfered surfaces 56 and 58 respectively. If desired, these surfaces may be circumferentially continuous and are preferably disposed in parallel inclined planes at a predetermined angle to the cylinder axis. Of course, other conventional means than the locking ring 42 may be employed for retaining the cylinder in the outer casing so that the ring receiving groove 41 in the cylinder wall would not be required, and in such cases only a single chamfered or inclined surface would be provided on the cylinder wall at 56.

Figure 3:
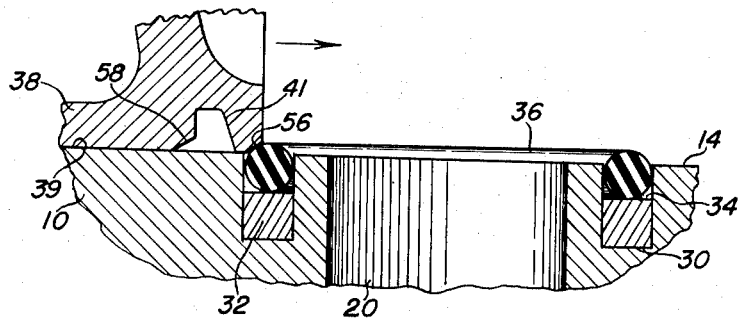
Figure 3 is a longitudinal sectional view on an enlarged scale illustrating a rotor cylinder in its position of inital contact with each resilient sealing ring during the axial insertion of the cylinder into the casing of Figure 1.

The internal surface 14 of casing 10 and the external surface 39 of cylinder 38 are accurately finished so that as the cylinder with the rotor assembly is axially inserted into its operative position within the casing with a free fit these surfaces will have rather close intimate contact throughout their area. The usual clearance in this space is about 0.004 inch. During such insertion of the rotor cylinder into the casing until the ports 46 and 48 thereof come into accurate alignment with the inlet and outlet ports 20 and 22 respectively in the casing wall, the chamfered surface 56 at the outer side of groove 41 first engages each sealing ring 36 projecting above the inner bore of the casing, as shown in Figure 3, and thereby compresses these rings within the grooves 28 and 29. As the open side of groove 41 in the cylinder wall passes over the sealing ring the ring may reexpand but it is later engaged by inner chamfered surface 58 on the cylinder and again compressed into the groove so that the sealing ring will not be cut or mutilated. This depression and compression of the sealing rings upon the filler rings 32 occurs progressively as the cylinder is axially moved into the casing, and when the cylinder has been fully inserted to its final assembled position with the flange 40 on the cylinder wall in abutting contact with the end of the casing wall, the sealing rings will be held tightly compressed within grooves 28 and 29 by the cylindrical peripheral surface 39 of cylinder 38. Also as illustrated in Figure 2 each resilient ring 36 when compressed into the groove is effectively distorted into substantially oval cross section thereby pressing tightly against the sides of grooves 28 and 29 as well as against cylinder surface 39.

Thus sealing rings 36 are automatically conditioned as the cylinder is inserted to its assembled position within the casing to exert a highly effective fluid tight sealing pressure against the peripheral surface of the cylinder wall about the passages defined by the registering fluid flow ports in that wall and the wall of the casing 10. Chamfers or countersinks 50 at the outer edges of cylinder ports 46 and 48 slide easily over the upper surfaces of rings 36 and thereby prevent tearing or mutilation of the sealing rings as these ports move into registration with the casing ports 20 and 22.

It will be evident from the above that such slight spacing as may be present between the adjacent peripheral surfaces of the casing and cylinder which may be present as the result of manufacturing tolerances or differences in diameter of bore 14 and surface 39 due to expansion and contraction of the walls under marked temperature variations will not result in leakage of fluid from the passages into the space between the cylinder and casing walls. Expansion of rings 36 will maintain the seal over all practical changes in dimension of this space. Since the concave surfaces 34 are substantially concentric with peripheral surfaces 14 and 39, the sealing rings 36 tend to maintain uniform thickness and thereby exert and maintain uniform sealing pressure against the peripheral surface 39 of the cylinder all around each port. No part of the ring 36 is compressed less than any other along its circumference so that the sealing action is the same all about each port.

In the above embodiment I have described the groove, insert ring and resilient sealing ring as provided in the bore of the outer member. The invention is equally applicable where the groove is cut in the cylindrical periphery of the inner member about the port.

Figure 8 illustrates this further embodiment wherein an inner member 60 having a cylindrical periphery 61 is axially inserted within an outer member 62 having a cylindrical bore 63. The members have communicating ports providing a through passage 64. A flat bottomed annular groove 65 is machined about the port opening in surface 61 and a flat bottomed hard insert ring 66 is positioned in the groove to locate its cylindrical end surface 67 parallel to bore 63 and at a predetermined radial distance therefrom. A resilient O-ring 68 like that at 36 is seated in the uniform depth recess thus provided, and it provides a uniformly tight seal about the passage as in the earlier embodiment.

In each embodiment I have therefore provided, by means of suitable inserts in easily machined recesses, grooves of circumferentially uniform and predetermined depth for reception of the resilient rings so that undesired distortion of the resilient rings is minimized and uniform sealing pressures about the passages is obtained.

While I have described the space between the members as cylindrical, it is seen that its curvature may not be continuous, the essential point being that the curvature of the top surface of each ring insert be parallel to the curvature of the associated peripheral surface against which the resilient ring is compressed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an assembly wherein two members having respective inner and outer peripheral surfaces of substantially cylindrical curvature are nested one within the other in a relatively fixed relation and a generally radial passage is provided extending through both members, means for effecting a fluid tight seal between said passage and the space between said relatively fixed peripheral surfaces comprising a continuous groove of non-uniform depth cut into one of said peripheral surfaces spaced from and surrounding the associated passage opening, an annular hard insert element seated in said groove, said element having a substantially cylindrical upper face below and parallel to said one peripheral surface so as to provide a continuous annular recess of uniform depth therein, and a continuous resilient annulus of a diameter substantially equal to the width of said recess compressed in said recess and against the peripheral surface of said other member surrounding the associated passage opening in that surface.

2. In the assembly defined in claim 1, said sealing means being mounted on the outer member.

3. In the assembly defined in claim 1, said sealing means being mounted on the inner member.

4. In the assembly defined in claim 1, said resilient annulus comprising a ring of elastomeric material of normally circular cross-section when relaxed.

5. In an assembly comprising an outer casing having a cylindrical bore and a cylinder adapted to be axially inserted to assembled position within said casing, the walls of said casing bore and cylinder having registering lateral fluid flow ports, and sealing means in one of said walls concentrically spaced from the ports comprising a circular groove of non-uniform depth cut into said one wall, an insert ring of hard material seated in said groove and having an upper cylindrically curved face below and parallel to said one wall to provide a uniform depth recess therein, and a resilient sealing ring of a diameter substantially equal to the width of said recess in said recess compressed between said casing and cylinder.

6. In the assembly defined in claim 5, said groove being formed in the casing wall and said ring when relaxed projecting inwardly of the internal surface of the casing wall prior to insertion of the cylinder, and an inclined surface on one end of said cylinder to engage the projecting sealing ring during insertion of the cylinder into said casing and compress said ring without undesirable distortion.

7. In the assembly defined in claim 6, the port in the cylinder wall at the outer surface thereof being provided with a chamfered edge.

8. In the assembly defined in claim 5, said casing having an opening therein diametrically opposite and of a size corresponding to said groove for permitting introduction of a tool for cutting said groove, and said cylinder when inserted closing said opening.

9. In an assembly wherein two members have respective substantially cylindrical surfaces closely adjacent each other in a relatively fixed relation and a passage extends through both members, means for effecting a fluid tight seal between the passage and the space between said members comprising a continuous flat bottomed groove of non-uniform depth in one of said surfaces concentrically spaced from said passage, a hard insert ring seated in and partially filling said groove and having its upper face curved substantially parallel to said one surface so as to provide above it a substantially uniform depth surface recess about the passage, and a resilient annulus of substantially circular cross-section when relaxed and of a diameter substantially equal to the width of said recess mounted in said uniform depth recess and compressed between said members.

FLORIS CLOETE.

References Cited in the file of this patent

UNITED STATES PATENTS

| Number | Name | Date |
|---|---|---|
| 978,504 | Stewart | Dec. 13, 1910 |
| 2,185,812 | Jimerson | Jan. 2, 1940 |
| 2,307,828 | Eggleston | Jan. 12, 1943 |
| 2,419,481 | Carbon | Apr. 22, 1947 |
| 2,480,529 | Waag | Aug. 30, 1948 |
| 2,485,915 | Parker | Oct. 25, 1949 |